(12) United States Patent
Gupta et al.

(10) Patent No.: US 11,750,512 B2
(45) Date of Patent: Sep. 5, 2023

(54) IDENTIFYING A DYNAMIC NETWORK PARAMETER PROBE INTERVAL IN AN SD-WAN

(71) Applicant: Hewlett Packard Enterprise Development LP, Houston, TX (US)

(72) Inventors: Gopal Gupta, Karnataka (IN); Abhinesh Mishra, Karnataka (IN); Isaac Theogaraj, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 171 days.

(21) Appl. No.: 17/189,750

(22) Filed: Mar. 2, 2021

(65) Prior Publication Data
US 2021/0336880 A1  Oct. 28, 2021

(51) Int. Cl.
| | |
|---|---|
| *H04L 45/64* | (2022.01) |
| *H04L 41/12* | (2022.01) |
| *H04L 45/50* | (2022.01) |
| *H04W 76/12* | (2018.01) |
| *H04W 76/15* | (2018.01) |
| *H04L 45/00* | (2022.01) |

(52) U.S. Cl.
CPC .............. *H04L 45/64* (2013.01); *H04L 41/12* (2013.01); *H04L 45/38* (2013.01); *H04L 45/50* (2013.01); *H04W 76/12* (2018.02); *H04W 76/15* (2018.02)

(58) Field of Classification Search
CPC ......... H04L 45/64; H04L 41/12; H04L 45/38; H04W 76/12; H04W 76/15
See application file for complete search history.

(56) References Cited

U.S. PATENT DOCUMENTS

2008/0291839 A1   11/2008  Hooper et al.
2020/0106696 A1*  4/2020  Michael ................ H04L 45/586
(Continued)

FOREIGN PATENT DOCUMENTS

CN       104717144 A  *  6/2015

OTHER PUBLICATIONS

Building a Software-defined WAN with NetScaler SD-WAN, (Research Paper), Retrieved Mar. 27, 2020, 6 Pgs.
(Continued)

*Primary Examiner* — Jackie Zuniga Abad
(74) *Attorney, Agent, or Firm* — Hewlett Packard Enterprise Patent Department (57) ABSTRACT

Some examples relate to identifying a dynamic network parameter probe interval in an SD-WAN. In an example, a controller may define a probe profile of an uplink in the SD-WAN. The probe profile of the uplink may include a static probe interval and a probe retry value. The controller may determine the value of the network parameter for the uplink, prior to expiration of a static probe timer interval. If the value of the network parameter is in negative deviation with a baseline value of the network parameter, the controller may identify a dynamic probe interval for each successive determination of the value of the network parameter. The identification of the dynamic probe interval for a given successive determination may depend on at least one previously determined value of the network parameter. The controller may initiate duplicate network traffic on a secondary uplink in the SD-WAN.

20 Claims, 5 Drawing Sheets

(56) References Cited

U.S. PATENT DOCUMENTS

2020/0379839 A1* 12/2020 Savalle .............. H04L 12/4633
2021/0168088 A1* 6/2021 Momchilov ........... H04L 47/36

OTHER PUBLICATIONS

VeloCloud Administration Guide. (Research Paper), Retrieved Mar. 27, 2020, 412 Pgs.
WAN Optimization and Data Duplication. (Web Page), Dec. 18, 2013, Retrieved Mar. 24, 2020. 8 Pgs . . . .

* cited by examiner

FIG. 1

| BW utilization (%) | Jitter (millisecond) | Latency (millisecond) | Packet Loss (%) |
|---|---|---|---|
| 10 | 3.750 | 20.0 | 0.16875 |
| 73 | 30.000 | 145.0 | 0.91875 |
| 76 | 112.500 | 55.0 | 0.18750 |
| 47 | 75.000 | 110.0 | 0.84375 |
| 30 | 54.375 | 67.5 | 0.07500 |
| 36 | 11.250 | 57.5 | 0.05625 |
| 59 | 52.500 | 70.0 | 1.01250 |
| 80 | 43.125 | 35.0 | 0.95625 |
| 19 | 13.125 | 32.5 | 0.20625 |
| 83 | 3.750 | 122.5 | 1.18125 |
| 58 | 35.625 | 107.5 | 0.43125 |
| 9 | 9.375 | 2.5 | 0.11250 |
| 81 | 35.625 | 142.5 | 0.69375 |
| 95 | 150.000 | 190.0 | 0.93750 |
| 41 | 5.625 | 45.0 | 0.67500 |
| 38 | 28.125 | 50.0 | 0.65625 |
| 39 | 73.125 | 95.0 | 0.63750 |
| 81 | 144.375 | 80.0 | 0.82500 |
| 97 | 15.000 | 97.5 | 1.05000 |

IDENTIFYING A DYNAMIC NETWORK PARAMETER PROBE INTERVAL IN AN SD-WAN

BACKGROUND

A wide area network (WAN) may connect individual machines or local area networks (LANs) over a long distance. WANs may be used to connect multiple business locations. WANs may allow companies to centralize or outsource IT infrastructure rather than host servers at each business location.

WANs may allow organizations to extend their computer networks over large distances, for example, to connect remote branch offices to data centers and each other. However, extending networks over large distances and sometimes across multiple carriers' networks may face challenges such as network congestion, jitter, packet loss, etc. Software-defined wide area network (SD-WAN) may be used to address these challenges.

An SD-WAN may simplify the management and operation of a WAN by decoupling (separating) the networking hardware from its control mechanism. SD-WAN solutions may employ centrally managed WAN edge devices placed in branch offices to establish logical connections with other branch edge devices across a physical WAN. An SD-WAN may be used to automatically balance workloads across multiple connections, maximize cost-efficiencies while optimizing applications and traffic across multiple uplinks.

An SD-WAN provides flexibility to use different uplinks for sending application traffic based on the application's requirement for uplink's Service Level Agreement (SLA). Applications may pose an SLA on the uplinks and if the SLA gets breached then applications may switchover to other uplinks in order to get an uninterrupted service.

BRIEF DESCRIPTION OF THE DRAWINGS

For a better understanding of the solution, examples will now be described, with reference to the accompanying drawings, in which.

DETAILED DESCRIPTION

The health of an uplink may be defined through various parameters such as jitter, latency, packet-loss, bandwidth-utilization, throughput etc. An SD-WAN may keep track of an uplink's health by sending probe packets and recording information related to the aforementioned parameters.

In some conventional systems, these health check probes may be triggered and an uplink's health parameters may be assessed based on a configured probe interval. The probe interval may be a static value, which does not adapt to an uplink's changing health. For example, in a scenario where a probe interval for checking a network parameter is a given time period and the SLA for a critical application gets breached just after the probe, it may pose issues for the critical application. The application's performance may suffer until the next probe confirms the breach and relevant actions are taken. Further, in case a switchover of network traffic from a primary uplink to a secondary uplink is carried out, the traffic may be abruptly stopped on the primary uplink, before it gets initiated on the secondary uplink. Moreover, the switchover may involve a penalty in terms of packet drops etc.

In the present disclosure various examples are described that identify a dynamic network parameter probe interval in an SD-WAN. Examples described herein allows probe interval to adjust itself as per an uplink's health conditions such as jitter, latency, packet-loss, bandwidth-utilization, throughput etc. It can become aggressive or placid depending on the uplink's health parameters. If uplink's health starts deteriorating and goes below a baselined value, then the probe becomes aggressive. If health improves and approaches the baselined value, the timer is gradually restored to the original value. This self-adjusting probe interval helps in reducing downtime of applications and enhances user experience.

In an example, a controller in an SD-WAN defines a probe profile of an uplink in the SD-WAN. The probe profile of the uplink includes a static probe interval whose expiration triggers a probe for determining a value of a network parameter for the uplink and a probe retry value that defines a number of times the value of the network parameter is to be determined. In an example, the controller determines the value of the network parameter for the uplink, prior to expiration of a static probe timer. The static probe timer defines a time limit for deciding whether to route network traffic through a secondary uplink in the SD-WAN. The controller determines whether the value of the network parameter is in negative deviation with a baseline value of the network parameter. In response to a determination that the value of the network parameter is in negative deviation with the baseline value, the controller identifies a dynamic probe interval for each successive determination of the value of the network parameter. The identification of the dynamic probe interval for a given successive determination may depend on at least one previously determined value of the network parameter. The successive determination of the value of the network parameter is performed for a given number of times, as defined by the probe retry value. The controller initiates duplicate network traffic, identical to network traffic passing through the uplink, on the secondary uplink in the SD-WAN. The duplicate network traffic may be transferred on the secondary uplink until expiration of the static probe interval.

Figure 1:
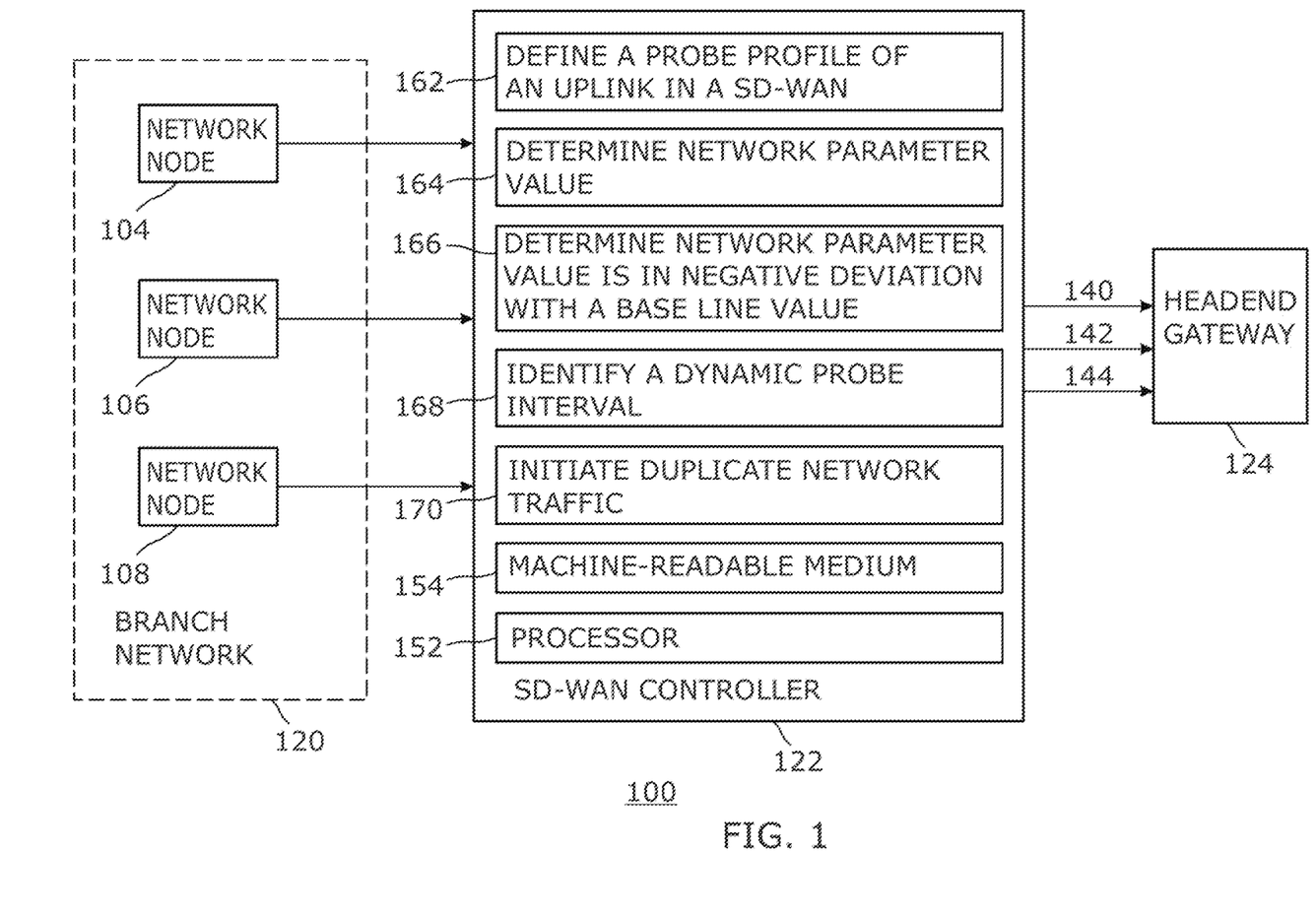
FIG. 1 is a block diagram of an example SD-WAN for identifying a dynamic network parameter probe interval.

FIG. 1 is a block diagram of an example SD-WAN 100 for identifying a dynamic network parameter probe.

In an example, SD-WAN 100 may comprise a branch network 120, an SD-WAN controller 122, and a headend gateway 124. In an example, the branch network 120 may be part of a branch office. The branch network 120 may include one or more network nodes (e.g., network nodes 104, 106, and 108) communicatively coupled via a computer network (e.g., a local area network (LAN) to SD-WAN controller 122. Although three network nodes 104, 106, and 108 are shown in FIG. 1, other examples of this disclosure may include more or fewer than three network nodes. Also, although one branch network is shown in FIG. 1, other examples of this disclosure may include additional branch networks at other branch offices. In an example, these additional branch networks may be managed via SD-WAN controller 122.

Network nodes 104, 106, and 108 may each include, by way of examples, a network device. Examples of the network device may include a network switch, a network router, a virtual switch, a virtual router, a VPN concentrator and a virtual internet gateway. In an example, network nodes 104, 106, and 108 may each be an SDN-enabled device.

Network nodes 104, 106, and 108 may each be configured to send data, to receive data, and to forward data. Network nodes 104, 106, and 108 may be referred to as source endpoints from which data originates. Endpoints that receive the data (e.g., headend gateway) are referred to as destination endpoints. For example, network nodes 104, 106, and 108 may each represent an endpoint for an SD-WAN controlled Layer 3 Virtual Private Network (L3VPN) overlay based on Internet Protocol Security (IPsec) tunneling. In order to establish a secure communication channel between a branch node and SD-WAN controller 122, a protocol, such as Internet Protocol Security (IPsec) may be used.

IPsec is a network protocol suite that authenticates and encrypts the packets of data sent over a network. IPsec, for example, may extend private networks through creation of encrypted tunnels which secure site to site connectivity across untrusted networks. IPsec may protect data flows between a pair of hosts, between a pair of security gateways, or between a security gateway and a host. An IPsec tunnel may allow encrypted IP traffic to be exchanged between the participating entities. In an example, each network node (for example, 104, 106, and 108) may represent an IPSec tunnel endpoint.

In an example, SD-WAN 100 may include additional network devices that are reachable or behind a network node (e.g., 104). These additional networks devices may be referred to as an internal network.

SD-WAN controller 122 may be any server, computing device, dedicated hardware, virtualized device, or the like. In an example, SD-WAN controller 110 may store and execute a computer application (machine-executable instructions). In an example, SD-WAN controller 122 may include a network device (for example, a network switch). In an example, SD-WAN controller 122 may include a Branch Gateway device.

In an example, SD-WAN controller 122 may be present in a cloud system. The cloud system may be a private cloud, a public cloud, or a hybrid cloud. The cloud system may be used to provide or deploy various types of cloud services. These may include Infrastructure as a Service (IaaS), Platform as a Service (PaaS), Software as a Service (SaaS), and so forth.

SD-WAN controller 122 may communicate with network nodes 104, 106, and 108 over a computer network. The computer network may be a wireless or wired network. The computer network may include, for example, a Wide Area Network (WAN), a Metropolitan Area Network (MAN), a Storage Area Network (SAN), a Campus Area Network (CAN), or the like. Further, the computer network may be a public network (for example, the Internet) or a private network.

SD-WAN controller 122 may communicate with headend gateway 124 through one or more WAN uplinks, for example, uplinks 140, 142, and 144, as illustrated in FIG. 1. These uplinks may be wired or wireless. In an example, uplink 140 may be based on Multiprotocol Label Switching (MPLS), uplink 142 may be based on 4G LTE, and uplink 144 may include broadband Internet. In some other examples, an uplink may use another communication technology such as 5G LTE, etc. In an example, an uplink (e.g., 142) may be configured as an active uplink (or "primary uplink") and another uplink (e.g., 144) may be configured as standby (or "secondary uplink"). In an example, network traffic via an uplink (primary or secondary) may terminate at headend gateway.

In an example, headend gateway 124 may part of a datacenter network or a campus network. In an example, headend gateway 124 may act as a VPN concentrator (VPNC) and run at the headend in hub-and-spoke and multi hub-and-spoke topologies. A VPN concentrator may provide a secure creation of VPN connections and delivery of messages between VPN nodes. Headend gateway 124 may act as a terminating point for IPsec VPN tunnels. Headend gateway 124 may be located, for example, at headquarter or a data center of an enterprise.

In an example, SD-WAN controller 122 may include a processor 152 and a machine-readable storage medium 154 communicatively coupled through a system bus. Processor 152 may be any type of Central Processing Unit (CPU), microprocessor, or processing logic that interprets and executes machine-readable instructions stored in machine-readable storage medium 154. Machine-readable storage medium 154 may be a random access memory (RAM) or another type of dynamic storage device that may store information and machine-readable instructions that may be executed by processor 152. For example, machine-readable storage medium 154 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 154 may be a non-transitory machine-readable medium.

In an example, machine-readable storage medium 154 may store machine-readable instructions (i.e. program code) 162, 164, 166, 168, and 170 that, when executed by processor 152, may at least partially implement some or all functions of SD-WAN controller 122.

In an example, instructions 162 may be executed by SD-WAN controller 122 to define a probe profile of an uplink in an SD-WAN. The probe profile of an uplink may include, for example, a static probe interval and a probe retry value. A static probe interval may be defined as a time interval whose expiration may trigger a probe for determining a value of a network parameter for an uplink. The duration of the static probe interval may vary, for example, from milliseconds to minutes. After each probe interval, a probe (or probes) may get triggered for determining a network parameter value (or values) for an uplink. Examples of the network parameter that may be determined by a probe may include jitter, latency, packet loss and bandwidth. A probe retry value may define a number of times the value of a network parameter may be determined.

In an example, instructions 162 may be executed by SD-WAN controller 122 to define a probe profile for each uplink (e.g., a primary uplink and a secondary uplink) in an SD-WAN. In an example, the probe profile of an uplink may be defined by a user (e.g., a network administrator). An example probe profile may be defined as: static probe interval=5 seconds and probe retry value=4.

In an example, instructions 164 may be executed by SD-WAN controller 122 to determine the value of a network parameter (e.g., jitter) for an uplink, prior to the expiration of a static probe timer. A static probe timer may be calculated as a sum of static probe intervals for a given number of probe retry values (or "probe retries"). Thus, for a static probe interval of 5 seconds and a probe retry value of 4, the static probe timer may be calculated as follows: 5 seconds+5 seconds+5 seconds+5 seconds=20 seconds. In an example, a static probe timer may be used to define a time limit for deciding whether to route network traffic through a secondary uplink in SD-WAN. Instructions 166 may be executed by SD-WAN controller to determine whether the value of the network parameter (e.g., jitter) is in negative deviation with a baseline value of the network parameter. In an example, a baseline value of a network parameter may be defined as the most frequent value observed for a network parameter on an uplink. The baseline value of a network parameter may be determined using a baselining algorithm. In an example, the baselining algorithm may be based on factors, for example, mean, most frequent value, and one-class support vector machine.

Figure 2:
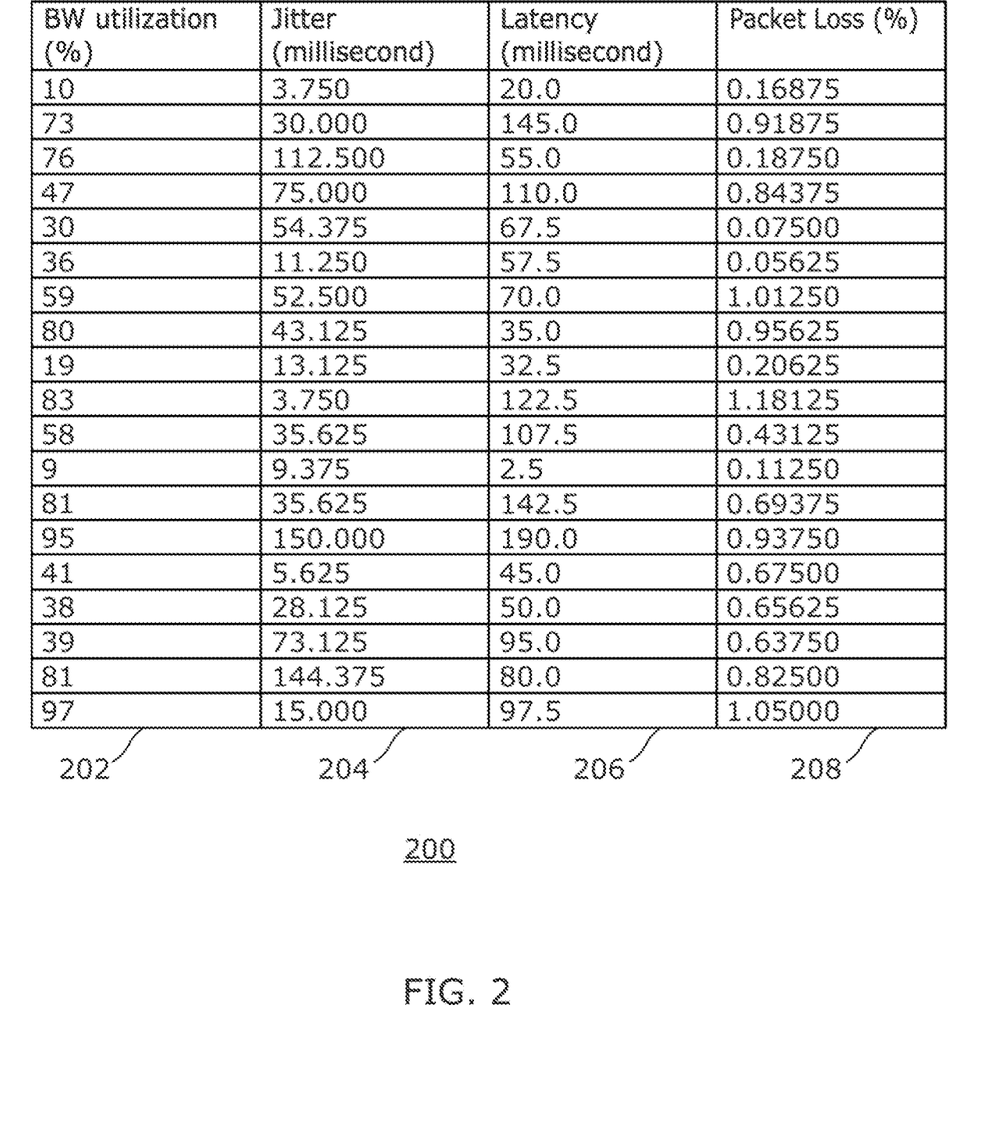
FIG. 2 illustrates an example dataset of values determined for example network parameters.

In an example, the baselining algorithm may use values observed over a period of time for a network parameter w.r.t. an uplink. The baselining algorithm may use a dataset 200 comprising those values, as illustrated in FIG. 2 for network parameters—bandwidth (BW) utilization 202, jitter 204, latency 206, and packet loss 208—to get baseline values of those network parameters. For example, based on the example dataset 200 illustrated in FIG. 2, following baseline values may be determined for network parameters: bandwidth (BW) utilization, jitter, latency, and packet loss.

Baseline value of jitter=106.87 milliseconds; baseline value of latency=142.5 milliseconds; baseline value of packet loss=1.068%, and baseline value of bandwidth utilization=41%.

In an example, the baseline value of a network parameter may be updated by executing the baselining algorithm at a regular interval which may vary, for example, from an hour to a week, or it may include another duration, as determined by a user. The values observed over a period of time for a network parameter w.r.t. an uplink may be stored, for example, on SD-WAN controller 122 and may be used for updating the baseline values at a regular interval.

In response to a determination that the value of a network parameter (e.g., jitter) is in negative deviation with the baseline value determined for the network parameter (e.g., jitter), instructions 168 may be executed, by SD-WAN controller 122, to identify a dynamic probe interval for each successive determination of the value of the network parameter (e.g., jitter). In other words, if prior to the expiration of the static probe timer, a determination is made that that the value of a network parameter (e.g., jitter) is in negative deviation with the baseline value of the network parameter (e.g., jitter), a dynamic probe interval may be identified for each successive determination of the value of the network parameter (e.g., jitter). To provide an example, if prior to the expiration of the static probe interval, it is determined that that the value (e.g., 106.87 milliseconds) of network parameter "jitter" is higher than the baseline value (e.g., 78.2 milliseconds) of "jitter", a dynamic probe interval may be identified for each successive determination of network parameter "jitter".

In an example, a dynamic probe interval for a given successive determination of a network parameter value may depend on at least one previously determined value of the network parameter. Referring to the aforementioned "jitter" example, once a determination is made that the value (e.g., 106.87 milliseconds) of network parameter "jitter" is higher than the baseline value (e.g., 78.2 milliseconds) of "jitter", the probe interval may be dynamically identified. In an example, the probe interval may be reduced, if the value of network parameter (e.g., jitter) is in negative deviation with its baseline value so that an action (examples mentioned below) may be taken earlier than the static probe timer. Thus, in the present example, if the original static probe interval was configured, for example, 5 seconds, the dynamic probe interval may be reduced to, for example, 4 seconds, for the first probe.

As mentioned earlier, identification of a dynamic interval for a given successive determination of a network parameter value may depend on at least one previously determined value of the network parameter. Thus, for a second probe, if the value of the network parameter further increases (e.g., 110.2 milliseconds), the dynamic probe interval may be further reduced (e.g., to 3 seconds) considering at least one previously determined value (e.g., 106.87 milliseconds) of the network parameter. Likewise, for a third probe, if the value of the network parameter further increases (e.g., 120.4 milliseconds), the dynamic probe interval may be further reduced as well (e.g., to 2 seconds) considering at least one previously determined value (e.g., 106.87, and/or 110.2 milliseconds) of the network parameter. In a similar manner, for a fourth probe, if the value of the network parameter continues to increase (e.g., 129.7 milliseconds), the dynamic probe interval may be further reduced (e.g., to 1 second) considering at least one previously determined value (e.g., 106.87, 110.2, and/or 120.4 milliseconds) of the network parameter. Thus, in an example, the dynamic probe interval may be successively reduced after each successive determination of the value of a network parameter, if there's a successive decrease in the value of the network parameter.

A successive determination of the value of a network parameter may be performed for a given number of times, as defined by the probe retry value in the probe profile of an uplink. Thus, considering the "jitter" example, if the probe retry value has been defined as "4" in the probe profile, the successive determination of the value of the network parameter "jitter" may be performed four times in all.

In another example, if the value of a network parameter starts decreasing (after moving up) during subsequent probes, the dynamic probe interval may be increased. In a further example, if the value of a network parameter approaches the baseline value of the network parameter, during subsequent probes, the dynamic probe interval may be restored to the original static probe interval value. Referring to the aforementioned "jitter" example, after a third probe, if the value of the network parameter decreases (e.g., 115.4 milliseconds), the dynamic probe interval may be adjusted and increased to (e.g., to 3.5 seconds) considering at least one previously determined value (e.g., 78.2, 65.2, and 75.2 milliseconds). Further, after a fourth probe, if the value of the network parameter decreases further (e.g., 79.4 milliseconds) and approaches the baseline value (e.g., 78.2 milliseconds), the dynamic probe interval may be restored to the original static probe interval value (e.g., 5 seconds). Thus, the dynamic probe interval is adjusted (increased or decreased) for a given successive determination of a network parameter value, based on at least one previously determined value of the network parameter. For example, the dynamic probe interval may be successively increased after each successive determination of the value of a network parameter, if there's a successive increase in the value of the network parameter.

As mentioned earlier, a successive determination of the value of a network parameter may be performed for a given number of times, as defined by the probe retry value. Once the given number of probe retries for a network parameter is complete, instructions 170 may be executed by SD-WAN controller 122 to initiate duplicate network traffic, identical to the network traffic passing through the uplink, on a secondary uplink in the SD-WAN 100. In an example, network traffic on the uplink and duplicate network traffic on the secondary uplink may relate to a specific application.

The initiation of duplicate network traffic may occur prior to the expiration of the original static probe timer. In an example, the initiation of duplicate network traffic may occur once the probe retries of dynamic probe timer expire. Dynamic probe timer may be calculated as a sum of dynamic probe intervals for a given number of probe retries. Referring to the aforementioned "jitter" example, dynamic probe timer for four probe retries may be calculated as follows: 4 seconds+3 seconds+2 seconds+1 second=10 seconds. On the other hand, the static probe timer in this case may be determined as: 5 seconds+5 seconds+5 seconds+5 seconds=20 seconds. Thus, in an example, if a dynamic probe timer is taken into consideration, compared to a static probe timer, it may reduce the response time for taking a corrective action. In the present case, the response time may be reduced by 10 seconds (i.e. 20 seconds–10 seconds). Examples of a corrective action may include identifying an uplink bad and initiating duplicate network traffic on a secondary uplink. It may, in turn, reduce downtime of an application(s).

In an example, after duplicate network traffic is initiated on the secondary uplink, the original network traffic on the uplink may continue as well. Thus, network traffic may run on both the uplinks until expiration of the static probe timer. In the context of "jitter" example, once duplicate network traffic is initiated (after 10 seconds), network traffic may run on both the uplinks for 10 seconds until expiration of the static probe timer (20 seconds).

In an example, network traffic via the uplink and the duplicate network traffic via the secondary uplink may terminate at headend gateway 124. In an example, simultaneous movement of same network traffic on both the uplinks may be achieved via next hop routing list mechanism. In an example, de-duplication may be performed at headend gateway 122 to eliminate duplicate packets. Thus, a target application may not even be aware of dual copies. In an example, this may be achieved at headend gateway's 124 datapath when network traffic belonging to same session arrives from two different uplinks (over IPSEC tunnels). Network traffic from the secondary uplink may be dropped. Hence, the end application (or device) may receive just one copy.

In an example, a determination may be made whether the last determined value of a network parameter (through last executed probe) before expiration of the static probe timer is in negative deviation with the baseline value. In response to a determination that the last determined value of the network parameter before the expiration of the static probe timer is in negative deviation with the baseline value, network traffic on the uplink may be stopped after expiration of the static probe timer. However, network traffic on the secondary uplink may continue.

In an example, a determination may be made whether the last determined value of a network parameter (through last executed probe) before expiration of the static probe timer has regained the baseline value. In response to a determination that last determined value of the network parameter before the expiration of the static probe timer has regained the baseline value, network traffic (i.e. "duplicate network traffic") on the secondary uplink may be stopped.

However, network traffic on the uplink may continue. Thus, only one uplink (primary or secondary) may continue to transfer network traffic post expiry of the static probe timer. This may lead to a proactive action on a link failure and eliminate the chances of a false failover.

Figure 3:
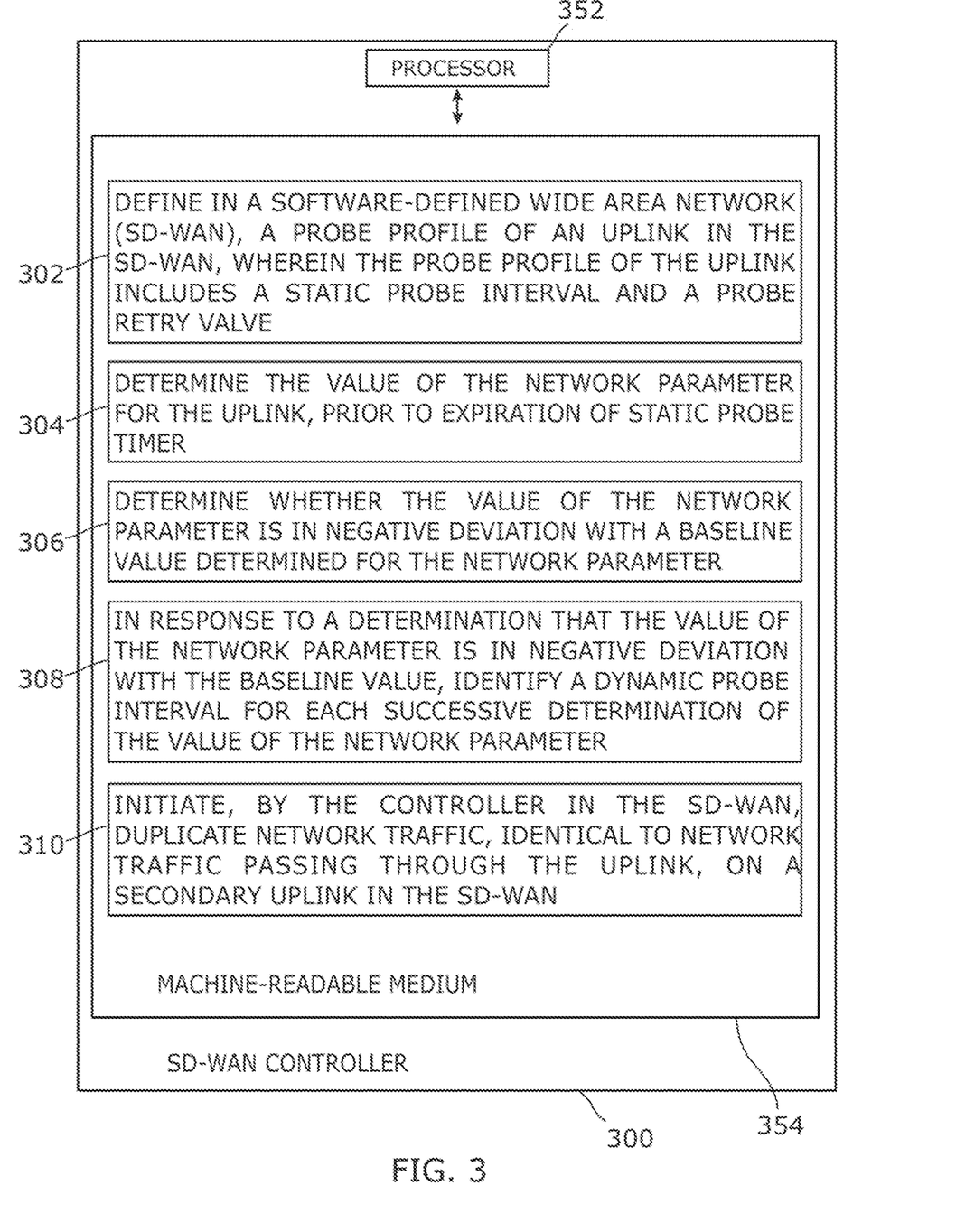
FIG. 3 is a block diagram of an example system for identifying a dynamic network parameter probe interval in an SD-WAN.

FIG. 3 is a block diagram of an example SD-WAN controller 300 for identifying a dynamic network parameter probe interval in an SD-WAN.

In an example, SD-WAN controller 300 may be analogous to SD-WAN controller 122 of FIG. 1, in which like reference numerals correspond to the same or similar, though perhaps not identical, components. For the sake of brevity, components or reference numerals of FIG. 3 having a same or similarly described function in FIG. 1 are not being described in connection with FIG. 3. Said components or reference numerals may be considered alike.

In an example, SD-WAN controller 300 may be any server, computing device, dedicated hardware, virtualized device, or the like. In an example, SD-WAN controller 300 may store and execute a computer application (machine-executable instructions). In an example, SD-WAN controller 300 may include a network device (for example, a network switch). In an example, SD-WAN controller 300 may include a Branch Gateway device. In an example, SD-WAN controller 300 may include a processor 352 and a machine-readable storage medium 354 communicatively coupled through a system bus. Processor 352 may be any type of Central Processing Unit (CPU), microprocessor, or processing logic that interprets and executes machine-readable instructions stored in machine-readable storage medium 354. Machine-readable storage medium 354 may be a random access memory (RAM) or another type of dynamic storage device that may store information and machine-readable instructions that may be executed by processor 352. For example, machine-readable storage medium 354 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 354 may be a non-transitory machine-readable medium.

In an example, machine-readable storage medium 354 may store machine-readable instructions (i.e. program code) 302, 304, 306, 308, and 310 that, when executed by processor 352, may at least partially implement some or all functions of primary source node.

In an example, instructions 302 may be executed to define a probe profile of an uplink in the SD-WAN. The probe profile of the uplink may include a static probe interval whose expiration triggers a probe for determining a value of a network parameter for the uplink and a probe retry value that defines a number of times the value of the network parameter is to be determined.

Instructions 304 may be executed to determine the value of the network parameter for the uplink, prior to the expiration of a static probe timer. A static probe timer may define a time limit for deciding whether to route network traffic through a secondary uplink in the SD-WAN. Instructions 306 may be executed to determine whether the value of the network parameter is in negative deviation with a baseline value of the network parameter.

In response to a determination that the value of the network parameter is in negative deviation with the baseline value, instructions 308 may be executed to identify a dynamic probe interval for each successive determination of the value of the network parameter. The identification of the dynamic probe interval for a given successive determination may depend on at least one previously determined value of the network parameter. The successive determination of the value of the network parameter may be performed for a given number of times, as defined by the probe retry value.

Instructions 310 may be executed to initiate duplicate network traffic, identical to network traffic passing through the uplink, on a secondary uplink in the SD-WAN. The duplicate network traffic may be transferred on the secondary uplink until expiration of the static probe interval.

Figure 4:
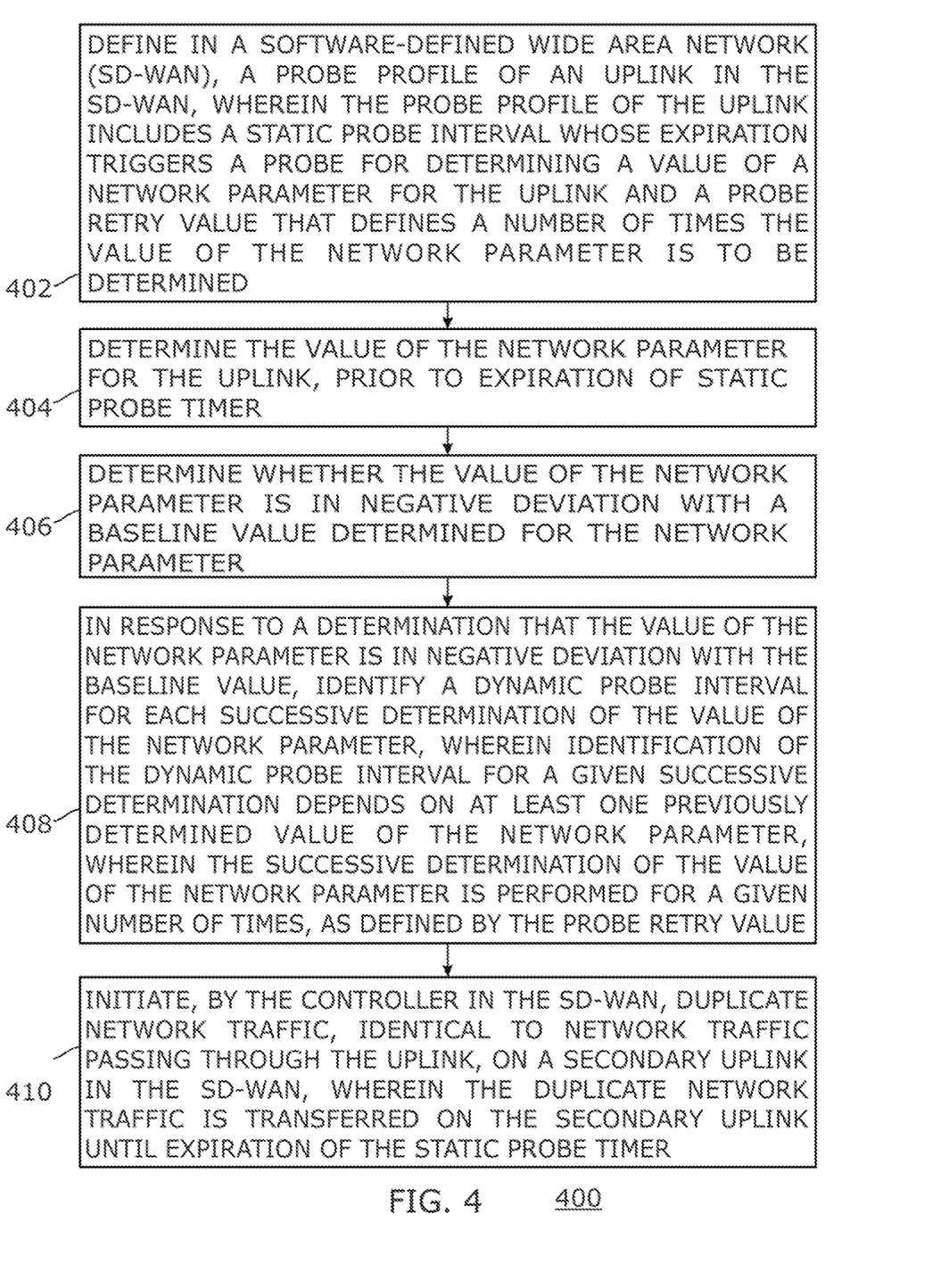
FIG. 4 is a block diagram of an example method of identifying a dynamic network parameter probe interval in an SD-WAN.

FIG. 4 is a block diagram of an example method 400 of identifying a dynamic network parameter probe interval in an SD-WAN. The method 400, which is described below, may be executed on a computing device such as SD-WAN controller 122 of FIG. 1 or 300 of FIG. 3. However, other devices may be used as well.

At block 402, a probe profile of an uplink in the SD-WAN may be defined. The probe profile of the uplink may include a static probe interval whose expiration triggers a probe for determining a value of a network parameter for the uplink and a probe retry value that defines a number of times the value of the network parameter is to be determined.

At block 404, the value of the network parameter for the uplink, prior to the expiration of a static probe timer, may be determined. A static probe timer may define a time limit for deciding whether to route network traffic through a secondary uplink in the SD-WAN. At block 406, a determination may be made whether the value of the network parameter is in negative deviation with a baseline value of the network parameter.

At block 408, in response to a determination that the value of the network parameter is in negative deviation with the baseline value, a dynamic probe interval for each successive determination of the value of the network parameter may be identified. The identification of the dynamic probe interval for a given successive determination may depend on at least one previously determined value of the network parameter. The successive determination of the value of the network parameter may be performed for a given number of times, as defined by the probe retry value.

At block 410, duplicate network traffic, identical to network traffic passing through the uplink, may be initiated on a secondary uplink in the SD-WAN. The duplicate network traffic may be transferred on the secondary uplink until expiration of the static probe timer.

Figure 5:
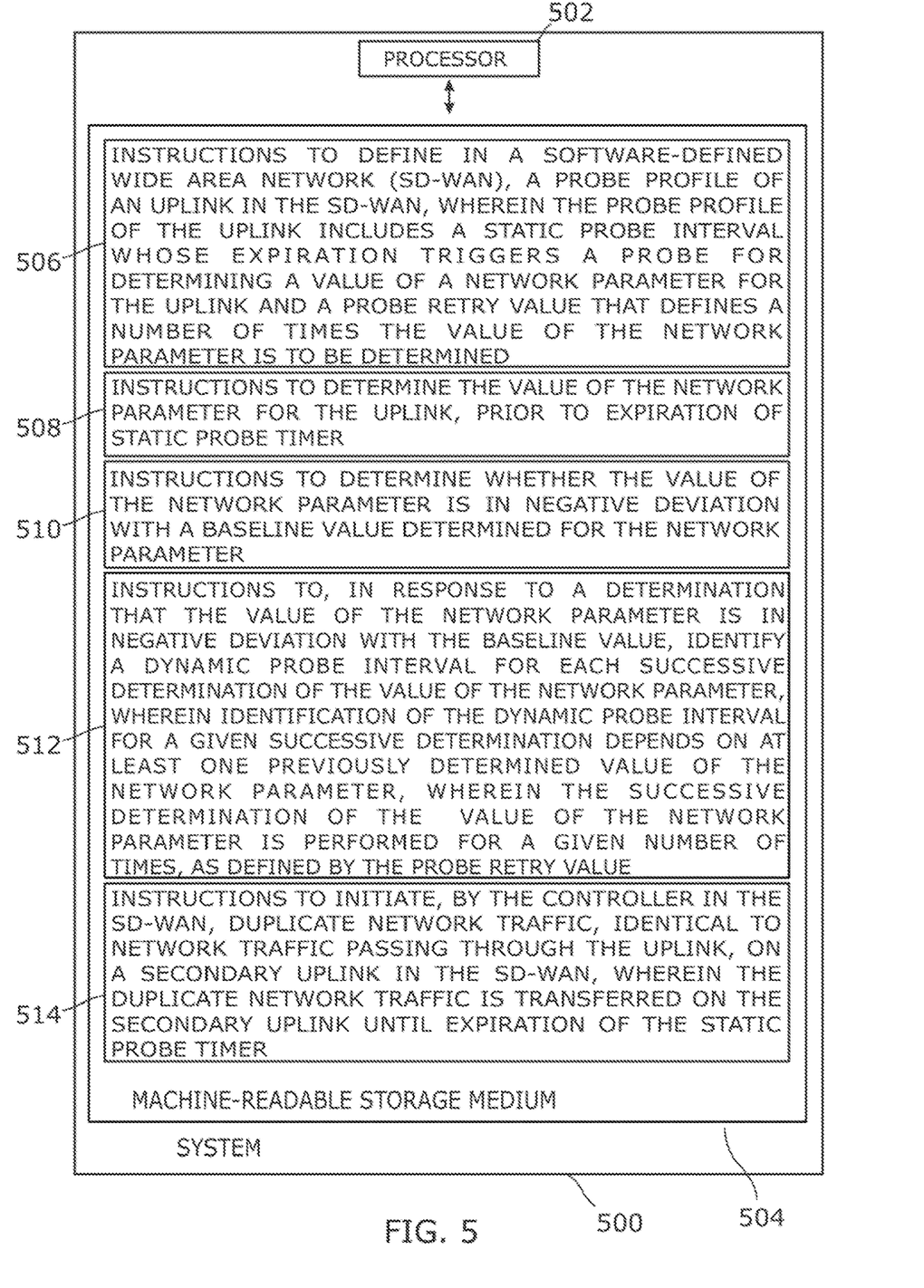
FIG. 5 is a block diagram of an example system including instructions in a machine-readable storage medium for identifying a dynamic network parameter probe interval in an SD-WAN.

FIG. 5 is a block diagram of an example system 500 including instructions in a machine-readable storage medium for identifying a dynamic network parameter probe interval in an SD-WAN.

System 500 includes a processor 502 and a machine-readable storage medium 504 communicatively coupled through a system bus. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In some examples, machine-readable storage medium 504 may be a non-transitory machine-readable medium. In some examples, machine-readable storage medium 504 may be remote but accessible to system 500.

Machine-readable storage medium 504 may store instructions 506, 508, 510, 512, and 514. In some examples, instructions 506 may be executed by processor 502 to define a probe profile of an uplink in the SD-WAN. The probe profile of the uplink may include a static probe interval whose expiration triggers a probe for determining a value of a network parameter for the uplink and a probe retry value that defines a number of times the value of the network parameter is to be determined.

Instructions 508 may be executed by processor 502 to determine the value of the network parameter for the uplink, prior to expiration of a static probe timer, which may define a time limit for deciding whether to route network traffic through a secondary uplink in the SD-WAN. At Instructions 510 may be executed by processor 502 to determine whether the value of the network parameter is in negative deviation with a baseline value of the network parameter.

In response to a determination that the value of the network parameter is in negative deviation with the baseline value, instructions 512 may be executed by processor 502 to identify a dynamic probe interval for each successive determination of the value of the network parameter. The identification of the dynamic probe interval for a given successive determination may depend on at least one previously determined value of the network parameter. The successive determination of the value of the network parameter may be performed for a given number of times, as defined by the probe retry value.

Instructions 514 may be executed by processor 502 to initiate duplicate network traffic, identical to network traffic passing through the uplink, on a secondary uplink in the SD-WAN. The duplicate network traffic may be transferred on the secondary uplink until expiration of the static probe timer.

For the purpose of simplicity of explanation, the example method of FIG. 4 is shown as executing serially, however it is to be understood and appreciated that the present and other examples are not limited by the illustrated order. The example systems of FIGS. 1, 3, and 5, and method of FIG. 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be understood that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:

defining, by a controller in a software-defined Wide Area Network (SD-WAN), a probe profile of an uplink in the SD-WAN, wherein the probe profile of the uplink includes a static probe interval whose expiration triggers a probe for determining a value of a network parameter for the uplink and a probe retry value that defines a number of times the value of the network parameter is to be determined;

determining, by the controller, the value of the network parameter for the uplink prior to expiration of a static probe timer determining, by the controller, whether the value of the network parameter is in negative deviation with a baseline value determined for the network parameter;

in response to the value of the network parameter being in negative deviation with the baseline value, identifying, by the controller, a dynamic probe interval for a respective subsequent determination of the value of the network parameter, wherein identification of the dynamic probe interval is based on at least one previously determined value of the network parameter, and wherein the subsequent determination of the value of the network parameter is performed for the probe retry value; and initiating, by the controller in the SD-WAN, duplicate network traffic, identical to network traffic passing through the uplink, on the secondary uplink in the SD-WAN, wherein the duplicate network traffic is transferred on the secondary uplink until expiration of the static probe timer.

2. The method of claim 1, further comprising reducing the dynamic probe interval in response to a successive decrease in the value of the network parameter.

3. The method of claim 1, further comprising increasing the dynamic probe interval in response to an increase in the value of the network parameter.

4. The method of claim 1, wherein the baseline value of the network parameter is a frequent value of the network parameter for the uplink.

5. The method of claim 1, wherein, in response to determining that a last determined value of the network parameter is in negative deviation with the baseline value, stopping transfer of the network traffic on the uplink and continuing transfer of the duplicate network traffic on the secondary uplink.

6. The method of claim 1, wherein in response to determining that a last determined value of the network parameter has regained the baseline value, stopping transfer of the duplicate network traffic on the secondary uplink and continuing transfer of the network traffic on the uplink.

7. The method of claim 1, wherein the network traffic via the uplink and the duplicate network traffic via the secondary uplink terminate at a headend gateway device capable of eliminating duplicate network packets through de-duplication.

8. The method of claim 1, wherein the uplink includes a communication channel based on one of: Multiprotocol Label Switching (MPLS), fourth generation (4G) long-term evolution (LTE) cellular wireless communication, fifth generation (5G) cellular wireless communication, and broadband Internet.

9. A controller in a software-defined Wide Area Network (SD-WAN), comprising:

a processor; and a machine-readable medium storing instructions that, when executed by the processor, cause the processor to:

define a probe profile of an uplink in the SD-WAN, wherein the probe profile of the uplink includes a static probe interval whose expiration triggers a probe for determining a value of a network parameter for the uplink and a probe retry value that defines a number of times the value of the network parameter is to be determined;

determine the value of the network parameter for the uplink prior to expiration of static probe timer;

determine whether the value of the network parameter is in negative deviation with a baseline value determined for the network parameter;

in response to the value of the network parameter being in negative deviation with the baseline value, identify a dynamic probe interval for a respective subsequent determination of the value of the network parameter, wherein identification of the dynamic probe interval is based on at least one previously determined value of the network parameter, and wherein the subsequent determination of the value of the network parameter is performed for the probe retry value; and initiate duplicate network traffic, identical to network traffic passing through the uplink, on the secondary uplink in the SD-WAN until expiration of the static probe timer.

10. The controller of claim 9, wherein the network parameter includes one or more of: jitter, latency, packet loss, and bandwidth utilization.

11. The controller of claim 9, wherein the secondary uplink includes a communication channel based on one of: Multiprotocol Label Switching (MPLS), fourth generation (4G) long-term evolution (LTE) cellular wireless communication, 5G cellular wireless communication, and broadband Internet.

12. The controller of claim 9, wherein the network traffic via the uplink and the duplicate network traffic via the secondary uplink terminate at a headend gateway device capable of eliminating duplicate network packets through de-duplication.

13. The controller of claim 9, wherein the network traffic is associated with a specific application.

14. The controller of claim 9, wherein the instructions to identify the dynamic probe interval include instructions to reduce or increase the dynamic probe interval in response to a decrease or an increase, respectively, in the value of the network parameter.

15. A non-transitory machine-readable storage medium comprising instructions, the instructions executable by a processor of a controller system of a software-defined Wide Area Network (SD-WAN) to:

define a probe profile of an uplink in the SD-WAN, wherein the probe profile of the uplink includes a static probe interval whose expiration triggers a probe for determining a value of a network parameter for the uplink and a probe retry value that defines a number of times the value of the network parameter is to be determined;

determine the value of the network parameter for the uplink, prior to expiration of static probe timer;

determine whether the value of the network parameter is in negative deviation with a baseline value determined for the network parameter;

in response to the value of the network parameter being in negative deviation with the baseline value, identify a dynamic probe interval for a respective subsequent determination of the value of the network parameter, wherein identification of the dynamic probe interval is based on at least one previously determined value of the network parameter, and wherein the subsequent determination of the value of the network parameter is performed for the probe retry value; and initiate duplicate network traffic, identical to network traffic passing through the uplink, on the secondary uplink in the SD-WAN until expiration of the static probe timer.

16. The storage medium of claim 15, wherein the controller system includes an SD-WAN branch gateway device.

17. The storage medium of claim 15, wherein the network traffic via the uplink and the duplicate network traffic via the secondary uplink terminate at a headend gateway device capable of eliminating duplicate network packets through de-duplication.

18. The storage medium of claim 15, wherein the instructions to identify the dynamic probe interval include instructions to reduce the dynamic probe interval in response to decrease in the value of the network parameter.

19. The storage medium of claim 15, wherein the instructions to identify the dynamic probe interval include instructions to increase the dynamic probe interval in response to an increase in the value of the network parameter.

20. The storage medium of claim 15, wherein the network parameter includes one or more of: jitter, latency, packet loss, and bandwidth utilization.

* * * * *